US009760642B2

(12) United States Patent
Bahrami et al.

(10) Patent No.: US 9,760,642 B2
(45) Date of Patent: *Sep. 12, 2017

(54) SYSTEM AND METHOD OF REDUCTION OF IRRELEVANT INFORMATION DURING SEARCH (71) Applicant: The Boeing Company, Chicago, IL (US)

(72) Inventors: Ali Bahrami, Sammamish, WA (US); Jun Yuan, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,069

(22) Filed: Jul. 10, 2015

(65) Prior Publication Data
US 2015/0324472 A1 Nov. 12, 2015

Related U.S. Application Data (63) Continuation of application No. 13/684,713, filed on Nov. 26, 2012, now Pat. No. 9,146,969.

(51) Int. Cl.
G06F 17/30 (2006.01)
G06F 17/27 (2006.01)
G06F 7/36 (2006.01)

(52) U.S. Cl.
CPC .......... *G06F 17/30867* (2013.01); *G06F 7/36* (2013.01); *G06F 17/2705* (2013.01);
(Continued)

(58) Field of Classification Search
CPC ................................ G06F 17/30539
(Continued)

(56) References Cited

U.S. PATENT DOCUMENTS 6,430,580 B1 8/2002 Azagury et al.
6,591,275 B1 7/2003 Russell et al.
(Continued)

OTHER PUBLICATIONS

Dorr et al., "Use of Syntactic and Semantic Filters for Lexical Acquisition: Using WordNet to Increase Precision," Workshop on Predicative Forms in Natural Language and Lexical Knowledge Bases, Aug. 1996, 8 pages.
(Continued)

Primary Examiner — Baoquoc N To
(74) Attorney, Agent, or Firm — Yee & Associates, P.C.

(57) ABSTRACT

A system including a context-entity factory configured to build a data model defining an ontology of data objects that are context-aware, the model further defining metadata tags for the data objects. The system further includes a storage device storing the data objects as stored data objects, the device further storing associated contexts for corresponding ones of the stored objects. The system further includes a reduction component configured to capture a current context value of a first data object defined in the ontology, the component further configured to compare the current context value of the first data object with stored values of the associated contexts, and wherein when the current context value does not match a particular stored value of a particular associated context, the component is further configured to remove a corresponding particular stored data object and the particular associated context from the stored data objects.

11 Claims, 6 Drawing Sheets (52) U.S. Cl.
CPC .... *G06F 17/3087* (2013.01); *G06F 17/30539* (2013.01); *G06F 17/30607* (2013.01); *G06F 17/30997* (2013.01)

(58) Field of Classification Search
USPC .................................................. 707/607, 776
See application file for complete search history.

(56) References Cited

U.S. PATENT DOCUMENTS

| | | | |
|---|---|---|---|
| 7,085,773 B2 | 8/2006 | Dorsett | |
| 7,438,226 B2 * | 10/2008 | Helsper | G06Q 30/06 235/375 |
| 7,543,740 B2 * | 6/2009 | Greene | G06Q 20/40 235/375 |
| 7,613,993 B1 | 11/2009 | Baer et al. | |
| 8,799,746 B2 | 8/2014 | Baker et al. | |
| 9,146,969 B2 | 9/2015 | Bahrami et al. | |
| 2004/0003244 A1 | 1/2004 | England et al. | |
| 2005/0289123 A1 * | 12/2005 | Dettinger | G06F 17/30864 |
| 2007/0168537 A1 * | 7/2007 | Misra | H04L 65/1069 709/230 |
| 2007/0266004 A1 * | 11/2007 | Wall | G06F 17/30486 |
| 2008/0208620 A1 * | 8/2008 | Karkanias | G06F 19/3443 705/2 |
| 2011/0153664 A1 * | 6/2011 | Lang | G06F 17/30286 707/776 |
| 2011/0167443 A1 | 7/2011 | Adler | |
| 2012/0115585 A1 * | 5/2012 | Goldman | G07F 17/3272 463/25 |
| 2013/0003567 A1 * | 1/2013 | Gallant | H04L 43/18 370/252 |
| 2013/0339818 A1 | 12/2013 | Baker et al. | |
| 2014/0059024 A1 * | 2/2014 | Le | H04L 43/045 707/694 |
| 2014/0108487 A1 * | 4/2014 | Rosset | G06F 17/30702 709/201 |
| 2014/0149436 A1 | 5/2014 | Bahrami et al. | |
| 2015/0019937 A1 | 1/2015 | Baker et al. | |

OTHER PUBLICATIONS

Yates et al., "Detecting Parser Errors Using Web-based Semantic Filters," Conference on Empirical Methods in Natural Language Processing, Jul. 2006, 8 pages.
Office Action, dated Jan. 16, 2015, regarding U.S. Appl. No. 13/684,713, 11 pages.
Notice of Allowance, dated May 22, 2015, regarding U.S. Appl. No. 13/684,713, 15 pages.
Extended European Search Report, dated May 16, 2017, regarding Application No. 13193440.8, 11 pages.
Earle et al., "OMG Earthquake! Can Twitter Improve Earthquake Response?", Seismological Research Letters, vol. 81, No. 2, Mar./Apr. 2010, pp. 246-251.

* cited by examiner

SYSTEM AND METHOD OF REDUCTION OF IRRELEVANT INFORMATION DURING SEARCH

This application is a continuation application of U.S. patent application Ser. No. 13/684,713, filed May Nov. 26, 2012.

BACKGROUND INFORMATION

1. Field

The present disclosure relates generally to improved data manipulation techniques and, in particular, to a system and method for reducing irrelevant information generated during search activities by filtering out irrelevant results based on association of a data object's values to values of contexts associated with the data object.

2. Background

Parties searching for specific information, particularly during ongoing events when real time information is readily available and abundant, may be inundated with input from a plurality of sources. However, much of the input may have no relevance or value at the moment given the immediate and concentrated nature of the task or mission. Additionally, recent years have seen an exponential growth in the quantity and diversity of readily available information sources. Information sources have proliferated in quantity, depth and diversity because of linkage of databases using evolving technologies such as data tags and data mining. While these developments may be beneficial in many respects, the increased availability of real time information may cause difficulty for parties operating under time constraints and seeking actionable and timely information needed to complete a specific task. Such difficulty may be more pronounced when the heavy volume of received input concerns events taking place concurrently, and a party faced with making decisions is relying primarily or solely on the incoming rush of information.

In addition to the expanding quantity of information stored in databases and in other storage locations such as cloud-based media, the sheer volume of real-time and near real-time information about ongoing events has also increased exponentially in recent years. Internet-based video and online social networking and microblogging services are examples of this widely accessible content. The growth of interactive and user-collaborative media associated with the advent of the Web 2.0 internet has spawned an explosion of content. Such content is easily and readily accessible at minimal or no cost from public sources. However, receiving and processing such available information may be burdensome due to the sheer volume of the information and raw format with which it is made available. Even a large organization with significant processing and storage capacity may be overwhelmed by the quantity of information available. Much of the information may not be relevant to the organization's immediate objective which may be to take action in a currently developing and dynamic situation.

Cross-correlation of information has historically been a manual process. However, incoming data may not be analyzed rapidly enough for timely action, and most such analyses are performed in isolation. Parties participating in or overseeing such events and charged with making decisions about allocating resources or moving personnel may benefit from tools that quickly discard information that is not immediately relevant. Filtering out irrelevant information may increase the agility and accuracy of decision making. Filtering out irrelevant information also may decrease complexity, present fewer and clearer choices, and reduce expense arising from direct management costs and wasted resources. Filtering out irrelevant information also may reduce opportunity costs associated with disregarding a good choice. Thus, effective new techniques for filtering out irrelevant information are considered desirable.

SUMMARY

The illustrative embodiments provide for a system. The system includes a context-entity factory configured to build a data model defining an ontology of data objects that are context-aware, the data model further defining metadata tags for the data objects. The system also includes a storage device storing the data objects as stored data objects, the storage device further storing associated contexts for corresponding ones of the stored data objects. The system also includes a reduction component configured to capture a current context value of a first data object defined in the ontology of data objects, the reduction component further configured to compare the current context value of the first data object with stored values of the associated contexts, and wherein when the current context value does not match a particular stored value of a particular associated context in the associated contexts, the reduction component is further configured to remove a corresponding particular stored data object and the particular associated context from the stored data objects.

The illustrative embodiments also provide for a method using a computer in conjunction with a non-transitory computer readable storage medium. The method comprises performing, using a processor, text mining of activity patterns on a first body of data comprising open-source unstructured text. The method also comprises performing, using the processor, constraint-based mining of activity patterns on a second body of data drawn from multiple heterogeneous sources. The method also comprises submitting, using the processor, output of text mining of activity patterns and output of constraint-based mining of activity patterns to at least one contextual query engine. The method also comprises building, using the at least one contextual query engine, at least one contextual query filter. The method also comprises providing, using the processor, the contextual query filter to at least one information mashup application for combination with at least one semantic query template. The method also comprises combining, using the processor and the at least one information mashup application, the at least one contextual query filter and the at least one semantic query template to produce at least one refined semantic query.

The illustrative embodiments also provide for another system. The system may include a computer comprising a bus, a processor connected to the bus, and a memory connected to the bus. The memory stores program code which, when executed by the processor, performs a computer-implemented method. The program code comprises program code for performing, using the processor, text mining of activity patterns on a first body of data comprising open-source unstructured text. The program code also comprises program code for performing, using the processor, constraint-based mining of activity patterns on a second body of data drawn from multiple heterogeneous sources. The program code also comprises program code for submitting, using the processor, output of text mining activity patterns and output of constraint-based mining of activity patterns to at least one contextual query engine. The program code also comprises program code for building, using the at least one contextual query engine, at least one contextual query filter. The program code also comprises program code for providing, using the processor, the at least one contextual query filter to at least one information mashup application for combination with at least one semantic query template. The program code also comprises program code for combining, using the processor and the information mashup application, the at least one contextual query filter and the at least one semantic query template to produce at least one refined semantic query.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account the issues described above with respect to searching through large amounts of information to find relevant information quickly. Thus, the illustrative embodiments relate to systems and methods wherein a large body of variously structured input is received from multiple sources. The illustrative embodiments provide for the correlation and association of a relevant subset of the input based on contextual associations of multiple information objects drawn from the input.

The illustrative embodiments also recognize and take into account that contextual information characterizes the situation of an entity or object at a given time. The entity may be a person, place, or other physical or computational object. When the entity is a person, primary contextual information may be the person's location, activity, condition, surrounding objects and names of groups or individuals with the person.

The illustrative embodiments may gather a large volume of contextual information during a brief period of time about a plurality of entities, for example persons. Based on analysis of associations of various items of contextual information about many instances of the entities, the illustrative embodiments may promote a rapid reduction in size of an initially gathered large body of raw data by eliminating information not immediately relevant to a manager, commander, or other decision maker.

The illustrative embodiments are based on primary contextual information associated with data objects. Such information may answer basic questions about the data object. When the data object is associated with a person, primary contextual information may describe where the person is, who is with the person, what objects are proximate to the person, and the surrounding objects' locations and identities. Such primary contextual information may act as indications into other sources of secondary or derivative contextual information such as, for example, relationships with other data objects in the environment. Specific non-limiting examples of relationships may include relationships among people and non-animate objects such as buildings and other landmarks.

With those relationships known, the illustrative embodiments may promote determinations of the degree of relevancy among multiple persons, activities, and physical objects that are present in close proximity. Based on these determinations, an interested party may be able to predict events, project resource needs, and test hypotheses, based in part on the rapid removal of irrelevant information promoted by the illustrative embodiments.

The illustrative embodiments provide for the capture of at least two types of information: data represented as data objects and associated metadata describing various contexts of the data objects. In a given information space, a plurality of instances of data objects, for example data objects representing named persons, may coexist and interact. Given a particular data object, the particular data object's current contextual situation and contextual trends may influence or shape the value of the data object at that moment. The association of contextual information with appropriate bindings of object value to data objects enables the system to filter information not relevant to a user's needs. The search space is rapidly reduced and the user is provided with valuable information in the appropriate context.

The illustrative embodiments also provide for the downloading of data from open source information systems wherein the information is both structured and unstructured. The information may be organized into collections and the collections may be grouped into periods for the purpose of creating separate temporal data sets. An ontology is then created to describe the semantic meaning of the data, including unique relationships.

The illustrative embodiments further provide that a contextual query then may be performed on the information. The contextual query may reduce the search space and may relieve information overload. This result may promote the finding of major events occurring, having just occurred, or potentially about to occur. Additional aspects of the illustrative embodiments are described below.

Figure 1:
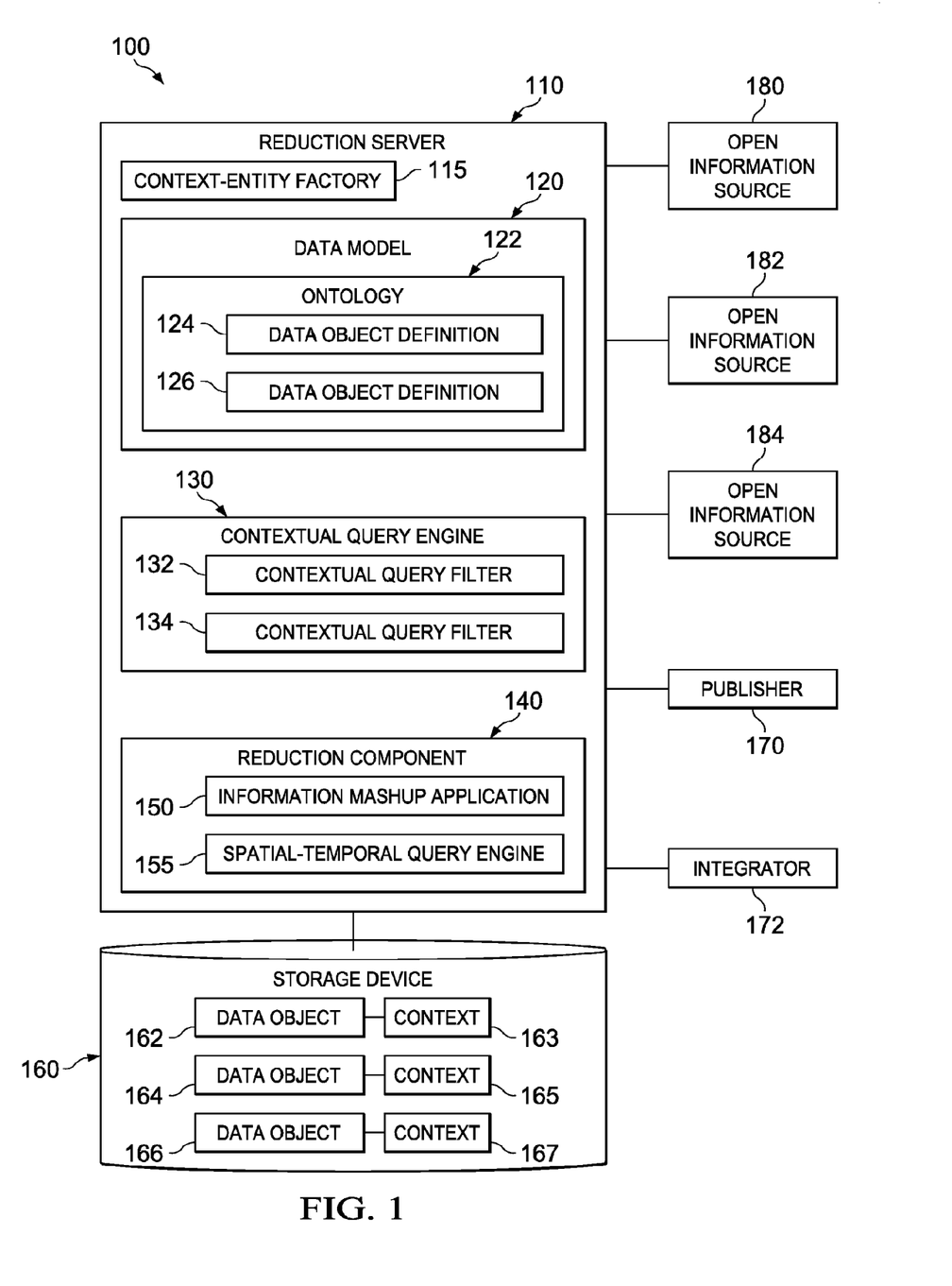
FIG. 1 is an illustration of a block diagram of a system for reduction of irrelevant information during search, in accordance with an illustrative embodiment.

FIG. 1 is an illustration of a block diagram of system 100 of reduction of irrelevant information during search, in accordance with an illustrative embodiment. System 100 shown in FIG. 1 comprises a reduction server 110. The reduction server 110 may be a data processing system. Data processing systems are described in detail hereinafter.

System 100 shown in FIG. 1 may be implemented using one or more data processing systems, possibly in a distributed or networked environment, and possibly by a group of remotely administered data processing systems known as the "cloud". Each of the one or more data processing systems that implement system 100 may be data processing system 600 described with respect to FIG. 6, or variations thereof. System 100 may be characterized as including one or more blocks. Each of these blocks may be separate or may be part of a monolithic architecture.

Reduction server 110 may include context-entity factory 115 that builds data model 120 from data gathered from a plurality of sources of data, for example but not limited to text messages. Reduction server 110 may have access to a large volume of text messages generated by persons participating in an ongoing event, for example. The persons generating the text messages may be represented by data objects in the system 100.

Context-entity factory 115 may create ontology 122 of data object 162, data object 164, and data object 166. Ontology 122 may be a structure or specification used by reduction server 110 to represent the various data objects, such as data object 162, data object 164, and data object 166 appropriate for a task or situation. Ontology 122 may describe the semantic meaning of data represented by the data objects. When more than one type of data object is defined by ontology 122, ontology 122 may define relationships between the multiple types of data objects. Data object 162, data object 164, and data object 166 defined by context-entity factory 115 may behave in manners that are consistent with definitions provided for ontology 122.

Context-entity factory 115 may provide at least one data object definition, such as data object definition 124 or data object definition 126, to be contained in ontology 122. In an embodiment, system 100 may be used to monitor and evaluate text messages and other data provided by a large plurality of participants in an ongoing event. The ongoing event may be an organized event, such as a participatory sports event or political or other convention. The ongoing event may be a less organized and spontaneously evolving event such as a group action associated with a protest or political movement. Many other types of events are contemplated. In these examples, data object definition 124 may define one or more of data object 162, data object 164, and data object 166 as representing persons.

The present disclosure provides that data object 162, data object 164, and data object 166 are context-aware. A subject entity, which may be a person associated with data object 162, also may be associated with identifying and descriptive information, for example current location, group memberships, telephone numbers, and electronic mail addresses. This comprises context information. Data object 162, data object 164, and data object 166 may be associated with context information through their linkage with metadata tags identifying the various context information for the data objects.

Context 163, context 165, and context 167 may be associated with corresponding ones of data object 162, data object 164, and data object 166, respectively. A data object, such as data object 162, associated with an event participant whose text messages are gathered and analyzed may have a metadata tag for a location context, such as context 163. The same data object may have another metadata tag for a proximate persons context, such as context 163. Data object definition 124 may define data object 162, its corresponding context 163 as designated by metadata tags, and the initial values of the context. Other data object definitions may be similarly arranged.

System 100 also may include storage device 160 in which data object 162, data object 164, and data object 166 and their corresponding contexts are stored. Although the storage device 160 is depicted in FIG. 1 as storing only a single context, context 163, for data object 162, in an embodiment a plurality of contexts and associated values may be associated with a single data object.

The initial values for the contexts are those values determined for the contexts when the data objects are created from the unstructured data. This situation may be at the beginning of a time period, for example an hour, a day, a week, or a month. The time period may not have a fixed duration when the time period is established and may instead be associated with a campaign or event, the durations of which may not be known exactly at the outset.

In an example, data object 162 may be established for an event participant named John Doe. Context 163 associated with data object 162 may be for location and the value stored for context 163 may be Westlake Park located in Seattle, Wash., USA.

The data objects created in accordance with data object definition 124 and data object definition 126, as well as the initial values for their associated contexts, may be stored in storage device 160. Storage device 160 may be associated with reduction server 110 and may host a relational or other database. Storage device 160 may store other data not associated with the present disclosure.

As part of building data model 120, context-entity factory 115 may be further configured to perform tensor analysis of a plurality of data objects, such as for example data object 162, data object 164, and data object 166. A "tensor" is a multi-dimensional array of numbers. A two-dimensional tensor has an order of two and may be represented by a two-dimensional array of numbers, which in a simplistic example may be a tic-tac-toe board. A three-dimensional tensor has an order of three and may be represented by a three-dimensional array of numbers, which may in a simple example be visualized as a large cube made up of smaller cubes, with each smaller cube representing a number entry. A simple way of visualizing an order three tensor might be to visualize a RUBIK'S CUBE®, where the tensor constitutes numbers associated with each component cube. Higher dimensional tensors are possible.

The illustrative embodiments contemplate capturing data for data object 162, data object 164, and data object 166 and storing that data in the form of tensors. Tensor analysis may then be performed on the resulting information in order to better manipulate the data. The purpose and functionality of tensor analysis is described further below. The techniques used for tensor analysis are known in the art of tensor mathematics.

The data forming the basis for these data objects may be sourced from multiple open information sources, such as open information source 180, open information source 182, and open information source 184. These open information sources may make available messages and other information generated in connection with online social networking services and microblogging services.

In an embodiment, these messages may be text-based messages and may be referred to as instant messages or text broadcasts. These messages may also be created by an unstructured text-based data service and may be from a feed of short message services, including instant messages. An example of a text broadcast created by an unstructured text-based data service may be a TWEET® from a TWITTER® account, though the illustrative embodiments are not limited to this type of text broadcast. Other open information sources may provide incident reports, news reports, commercial/industry data, literature, surveys, advertisements, images/videos, locations and maps and security and emergency reports. The illustrative embodiments contemplate use of other types and sources of data, including heterogeneous information sources.

By performing the tensor analysis of a plurality of items of structured and unstructured data, context-entity factory 115 may derive contextual relationships among the selected data as a first step in building data model 120. The tensor analysis performed by context-entity factory 115 may include constructing a sequence of tensors representing an underlying network at each of a plurality of time instances along a temporal axis. Tensor decompositions may be performed on each tensor in a sequence and changes may be analyzed by comparing results from each tensor decomposition. The output of tensor analysis may be at least one set of files for each time period during which data was captured from the multiple open information sources.

As another part of building data model 120, context-entity factory 115 may be further configured to perform constraint-based mining of activity patterns of data associated with the structured and unstructured data. Constraint-based mining may assist in determining activity patterns representing contextual relationships among the received data. The activity patterns may be associated with multi-relational data and may describe recurring relationships among different types of records.

Figure 6:
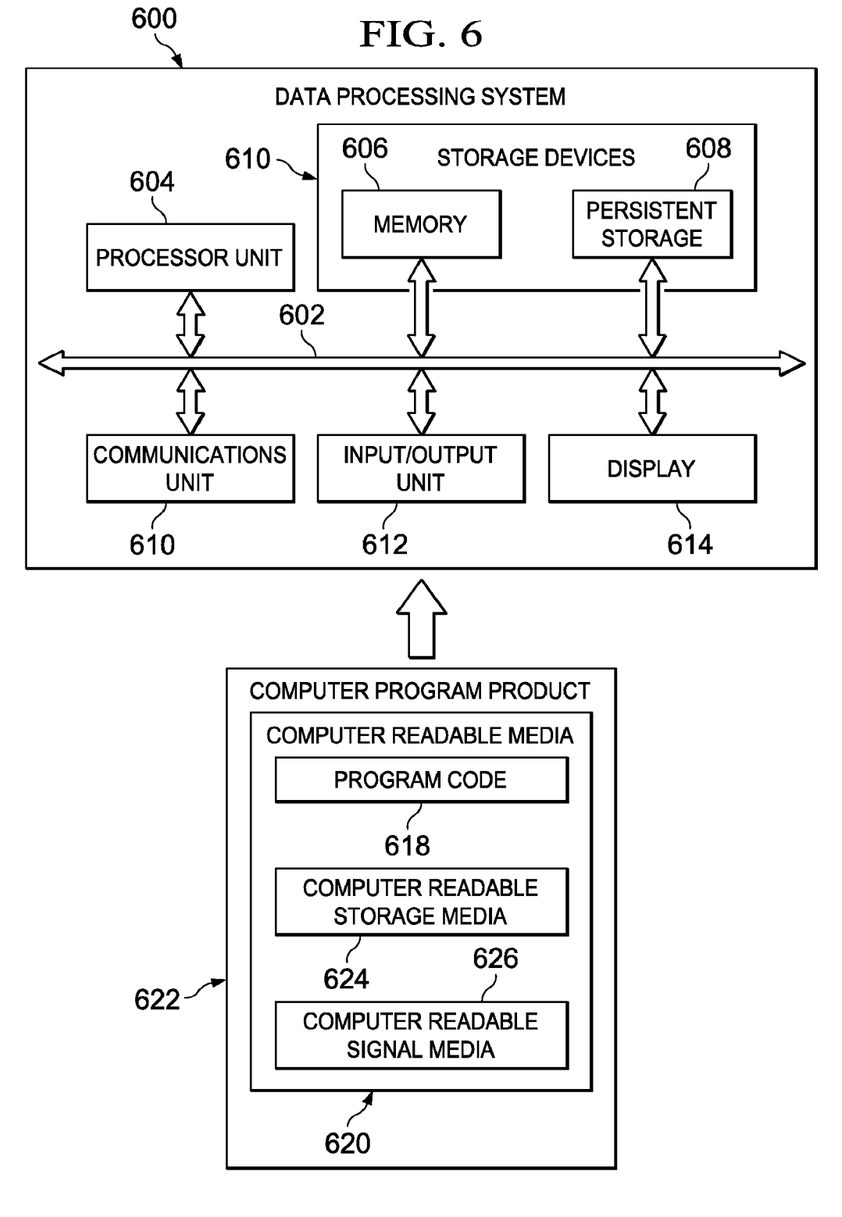
FIG. 6 is an illustration of a data processing system, in accordance with an illustrative embodiment.

System 100 also may include contextual query engine 130 that may execute on reduction server 110. Reduction server 110 submits the results of the tensor analysis and the results of the constraint-based mining of activity patterns to contextual query engine 130. From this input, contextual query engine 130 may construct at least one contextual query filter, such as contextual query filter 132 and contextual query filter 134. The at least one contextual query filter may use an associative memory to associate and retrieve an actionable piece of data or concept and filter out irrelevant information. Contextual correlation using an associative memory is depicted in FIG. 6. Contextual query filter 132 may be used for real-time contextual query filtering.

Reduction server 110 also may include reduction component 140. Reduction component 140 may include several subcomponents useful for reducing irrelevant information during query operations. Those subcomponents are described in detail below in the discussion of the components that together make up reduction component 140.

Reduction component 140, at a predetermined point after the beginning of the time period or at start, may capture a current value of context 163. Reduction component 140 may compare the captured current value of context 163 with the stored value of context 163 that was established when data object 162 (with which context 163 is associated) was created. When the current value of context 163 does not match the stored value of the context, associated data object 162 and context 163 may be removed from the stored data objects in storage device 160.

In the brief example provided above involving data object 162 for John Doe with an initial value of context 163 of Westlake Park, at some point after the beginning of the time period, reduction component 140 may capture a current value of context 163. Reduction component 140 may compare the current value with the stored value. If the value of the current context is Westlake Park (or close proximity thereof) and thereby matches the stored value, then data object 162 for John Doe remains stored in storage device 160.

If the value of the current context is determined to be distant from Westlake Park, for example Tacoma or Spokane, data object 162 and its stored context 163 may be removed. In this particular example, data object 162 and stored context may be removed because John Doe is no longer relevant to a decision maker about activities going on in and around Westlake Park at that time. John Doe is no longer relevant because John Doe is no longer in the area. When a new time period is established, new data object 162 may be created for John Doe if he is determined to be in the area of Westlake Park or other area of interest. Because, in the example used herein, an event organizer or decision maker may be interested only or primarily in events concurrently taking place in and around Westlake Park, data object 162 for persons determined to have departed that area are removed since they are no longer relevant during that time period.

Reduction component 140 may repeatedly perform the above process of capturing of current context values and comparing them to stored values of context 163, context 165, and/or context 167 for a few, hundreds, or thousands of data objects, such as data object 162, data object 164, and data object 166. System 100 may examine context 163, context value 165, and/or context value 167 for corresponding ones of data object, 162, data object 164, and/or data object 166, respectively, and may correlate them in different ways.

Secondary or derivative context information also may be determined and analyzed. This process may promote a further elimination of irrelevant data and refinement of results.

Reduction component 140 may include a query component configured to query the reduced number of data objects relative to a beginning number of data objects. Based on this analysis, a decision maker may be able to determine how to mobilize human, material, information, and other resources based on movements and groupings of people and their reported observations. The illustrative embodiments contemplate that by promoting expedient removal of data objects with current context values that no longer match corresponding stored values of contexts, irrelevant information may be rapidly eliminated from consideration. This result may provide the decision maker with a more manageable and meaningful body of material on which to base decisions.

Reduction component 140 also may include at least one information mashup application 150 that may execute on reduction server 110. Information mashup application 150 may be a web page or web application that uses and combines data, presentation or functionality from multiple sources to create new services. Information mashup application 150 may be configured to combine data, to visualize data and/or results, or to aggregate data. Information mashup application 150, which may be context-aware, may receive at least one of contextual query filter 132 or contextual query filter 134 from contextual query engine 130. The at least one contextual query filter then may be combined with at least one semantic query template by information mashup application 150. This combination may produce at least one refined semantic query.

Information mashup application 150 also may be configured to access spatial-temporal query engine 155. Spatial-temporal query engine 155 may be part of system 100 in association with creation of the refined semantic query. Information mashup application 150 may access spatial-temporal query engine 155 to generate an output of contextual relationships of multiple spatial data and temporal data objects. Spatial-temporal query engine 155 may have an in-memory indexing structure of both temporal and spatial data that may provide ad-hoc temporal and spatial query capabilities given a particular location and a particular time.

A semantic information integration service that underlies information mashup application 150 and spatial-temporal query engine 155 may provide leveraging and extending semantic web functionalities. This service may provide a unified single access point for multiple data systems. This service may have other functions, such as to dispatch queries to databases of information sources that may be participating, or to integrate and correlate multiple datasets together. The underlying semantic information integration service may use simple object access protocol (SOAP) over hypertext transfer protocol (HTTP). The service may be based on an Apache Axis2 implementation of both the client and server sides of a web services configuration and may be based on JAVA®. Apache Axis2 may be installed in a container such as Apache Tomcat, an open source software implementation of the JAVA® Servlet and JAVASERVER® Pages technologies.

System 100 also may include publisher 170. Publisher 170 may be configured to publish an output of reduction component 140 as a service in a service-oriented architecture. Publisher 170 is alternatively configured to publish such output to at least one of an enterprise portal, an application, and a development tool.

System 100 also may include integrator 172. Integrator 172 may be configured to interoperate an output of reduction component 140 with an enterprise application technology. Such enterprise application technology may be selected from at least one of a security application, a governance application, a monitoring application, and an availability application.

In an embodiment, the systems and methods described herein may be useful in monitoring personnel movements, interactions and communications during events that may take place over several days, weeks, or months in an urban or metropolitan area, or other settings. Events occurring during such events could include marches, meetings, demonstrations, occupations, and street protests. The structures and agendas of such events may range from being fully planned and carefully executed to being entirely spontaneous, not organized, and organically evolving.

Many participants in these events may carry portable telephones and other devices on their persons. These participants may send a plurality of text messages and TWEETS® as these events are beginning and progressing. Their messages may contain audio, images, video and other content in addition to text. In the messages the participants may describe their location, surrounding objects, proximate people, and actions taking place. This information may be publicly available on about a real time basis and may include open source information, both structured and unstructured.

In an example, unstructured information for the social media service TWITTER® was analyzed. Data originally created by about twenty TWITTER® accounts was downloaded. A snapshot of about 70,000 messages ("TWEETS"®) over a six month period was analyzed and organized into three different collections: all TWEETS, RETWEETS®, and TWEETS® with HASHTAGS®. Each collection was further grouped into one month periods for the purpose of creating separate temporal tensor models for social network-based analysis. An ontology was created to describe the meaning of the TWITTER® data, including some relationships of TWITTER® data. These relationships included "follower", "RETWEET®", "mentions" and "replies." For structured data, the data was downloaded from a local government internet site. The information included police department 911 reports, real time fire department 911 calls, police reports about incidents and offenses, and neighborhood maps.

The structured and unstructured information was analyzed using the techniques described above. Upon receipt of a query, only information deemed relevant to the user was returned. For example, the illustrative embodiments have demonstrated an outcome of reducing 70% of data deemed irrelevant by a user. In addition, the illustrative embodiments have demonstrated an outcome of returning specific information the user desires 85% of the time. Both outcomes were achieved using a single query.

Figure 4:
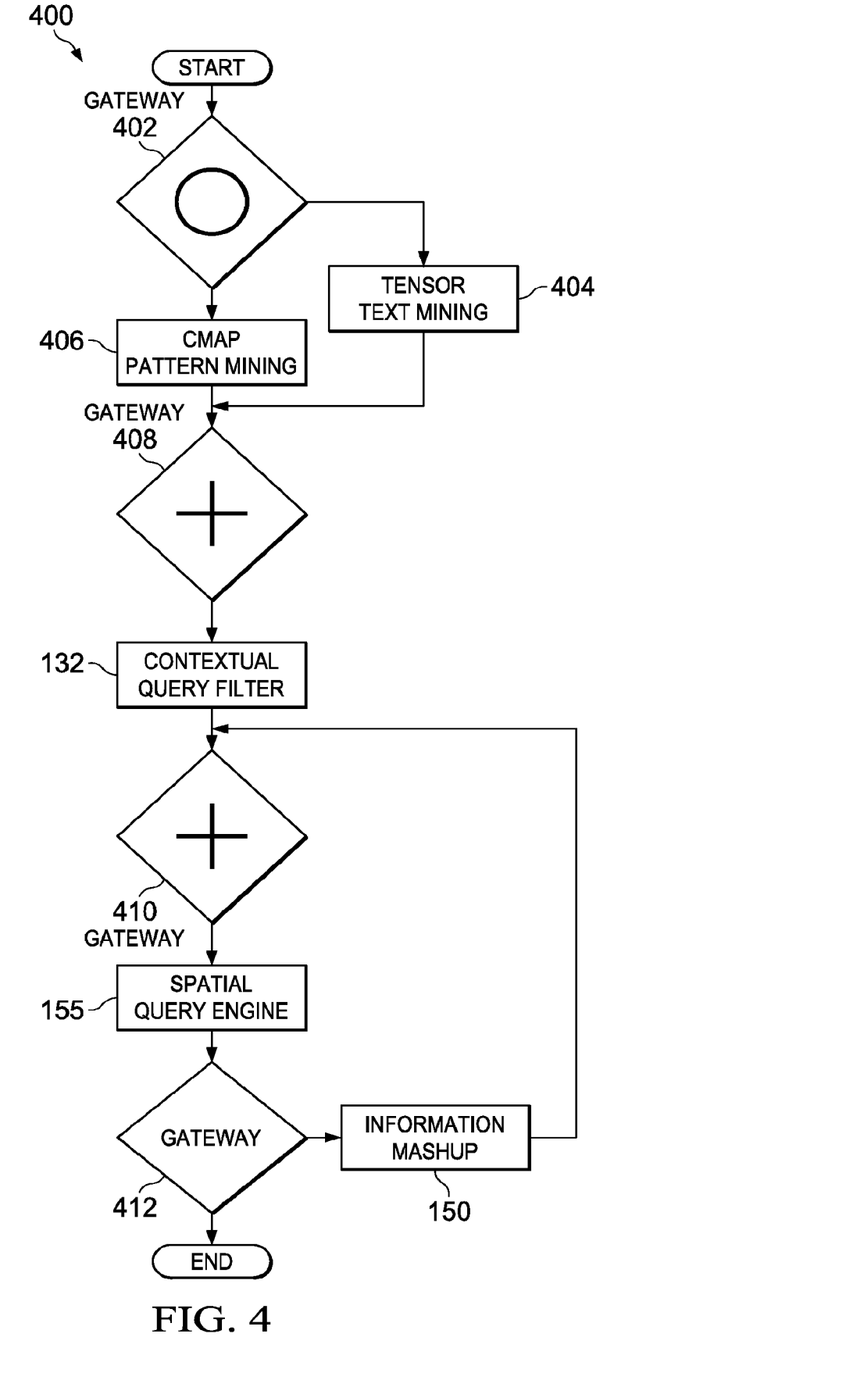
FIG. 4 is an illustration of a block diagram of another workflow, in accordance with an illustrative embodiment.
Figure 5:
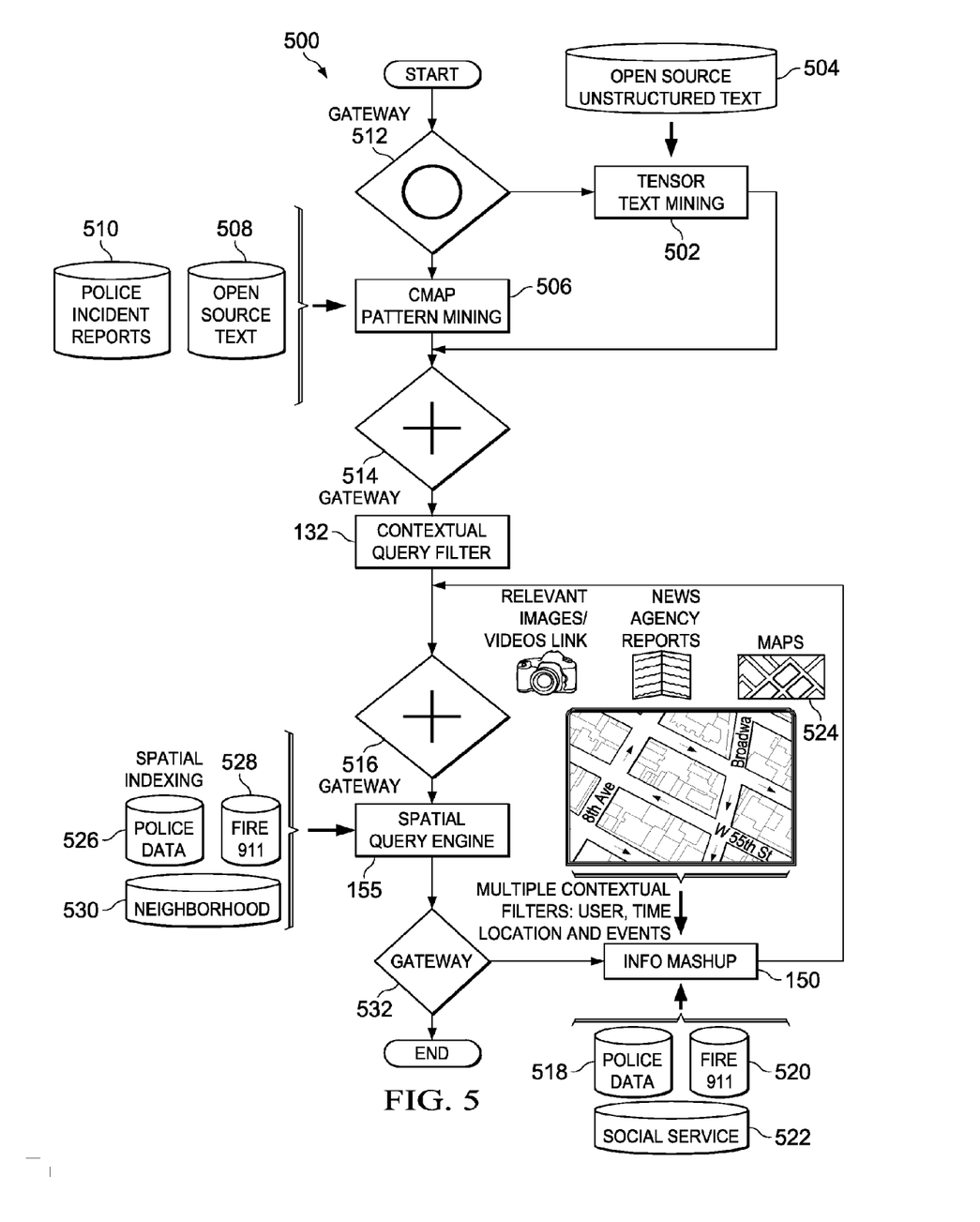
FIG. 5 is an illustration of a block diagram of another workflow, in accordance with an illustrative embodiment.

A block diagram of the workflow associated with this illustrative embodiment is provided in FIG. 5. Block diagrams of other workflows associated with other illustrative embodiments are presented in FIG. 3 and FIG. 4.

In an embodiment, contextual query engine 130 and information mashup application 150 may be widget applications. In an embodiment, contextual query engine 130 may be referred to as a contextual query widget. Widget applications may be hosted within a web browser by a combination layout manager and messaging mechanism. A user interface of each process and each composite service may be displayed as a single widget in the user workbench.

In an illustrative embodiment, the data may be sourced from multiple sources. In this case, the system may further include one of a publisher and an integrator. The publisher may be configured to one of publish an output of the reduction component as a service in a service oriented architecture and publish the output to at least one of an enterprise portal, an application, and a development tool. The integrator may be configured to interoperate an output of the reduction component with an enterprise application technology selected from at least one of a security application, a governance application, a monitoring application, and an availability application.

Figure 2:
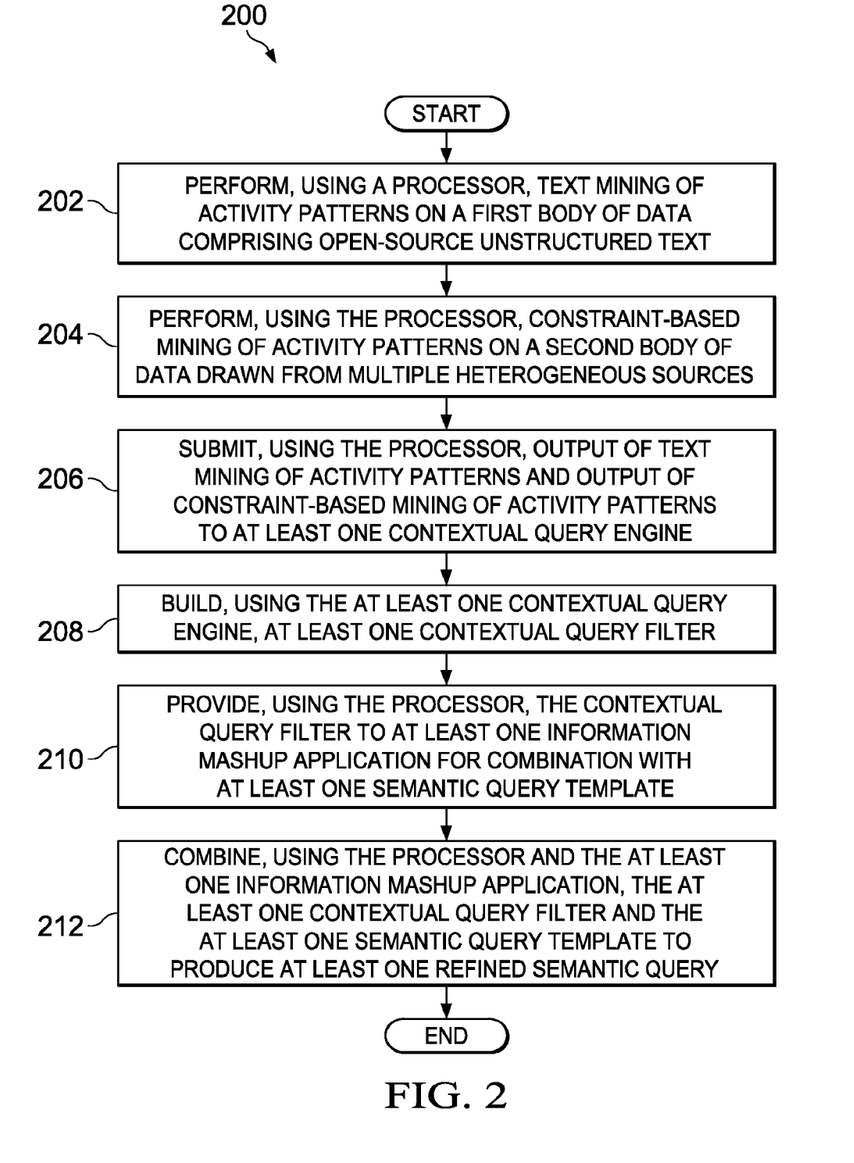
FIG. 2 is an illustration of a block diagram of a method for reduction of irrelevant information during search, in accordance with an illustrative embodiment.

FIG. 2 is an illustration of a block diagram of a method for reduction of irrelevant information during a search, in accordance with an illustrative embodiment. Method 200 shown in FIG. 2 may be implemented using system 100 of FIG. 1. The process shown in FIG. 2 may be implemented by a processor, such as processor unit 604 of FIG. 6. The process shown in FIG. 2 may be a variation of the processes shown in FIG. 1, FIG. 2, and FIG. 3 through FIG. 5. Although the operations presented in FIG. 2 are described as being performed by "a process," the operations are being performed by at least one tangible processor or using one or more physical devices, as described elsewhere herein.

Method 200 may begin as the process performs, using a processor, text mining of activity patterns on a first body of data comprising open-source unstructured text (operation 202). The process may then perform, using the processor, constraint-based mining of activity patterns on a second body of data drawn from multiple heterogeneous sources (operation 204). The process may then submit, using the processor, output of text mining of activity patterns and output of constraint-based mining of activity patterns to at least one contextual query engine (operation 206). The process may then build, using the at least one contextual query engine, at least one contextual query filter (operation 208). The process may then provide, using the processor, the contextual query filter to at least one information mashup application for combination with at least one semantic query template (operation 210). The process may then combine, using the processor and the at least one information mashup application, the at least one contextual query filter and the at least one semantic query template to produce at least one refined semantic query (operation 212). The process may terminate thereafter.

Figure 3:
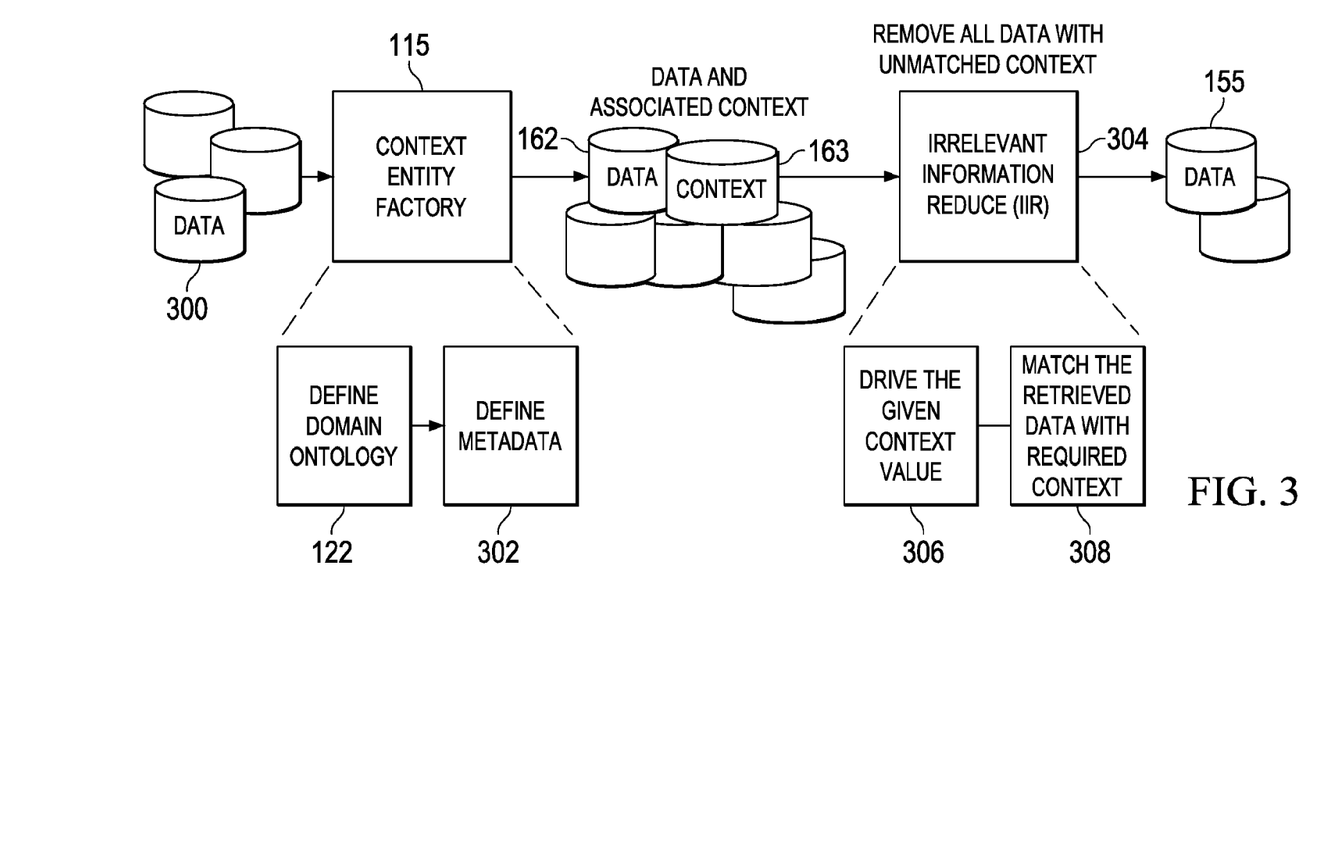
FIG. 3 is an illustration of a block diagram of a workflow, in accordance with an illustrative embodiment.

FIG. 3 is an illustration of a block diagram of a workflow, in accordance with an illustrative embodiment. The workflow depicted in FIG. 3 may be implemented using system 100 of FIG. 1. The workflow shown in FIG. 3 may be implemented by a processor, such as processor unit 604 of FIG. 6. The workflow shown in FIG. 3 may be a variation of the processes shown in FIG. 1, FIG. 2, FIG. 4, and FIG. 5. Although some of the operations presented in FIG. 3 might be described as being performed by "a workflow," such operations are being performed by at least one tangible processor or using one or more physical devices, as described elsewhere herein.

Reference numerals common to FIG. 1 may relate to similar features. Thus, for example, context-entity factory 115 shown in both FIG. 1 and FIG. 3 may relate to the same kind of context-entity factory, though they need not be the same. However, for purposes of the illustrative embodiments described herein, functions and aspects of context entity factory 115 in FIG. 1 and FIG. 3 may be considered interchangeable, unless stated otherwise.

In an illustrative embodiment, a reduction server, such as reduction server 110 of FIG. 1, may furnish structured and unstructured data, such as data 300, to context-entity factory 115. The reduction server may create ontology 122, including analysis and definition/modification of a data model, such as data model 120 of FIG. 1, from data 300. The reduction server may define metadata 302. Defining metadata 302 may include analysis and definition or modification of multi-dimensional contextual metadata. The reduction server may store metadata 302, which may be multi-dimensional contextual metadata, in a storage device, such as storage device 160 of FIG. 1. The data and metadata may be linked as data objects, such as data object 162 and context 163 in FIG. 1. The data objects may be stored in a storage device, such as storage device 160 of FIG. 1. The data objects, such as data object 162, may be unstructured data objects.

Workflow 304 entitled "Irrelevant Information Reduce (IIR)" may represent an information mashup application, such as information mashup application 150 of FIG. 1, as well as a spatial-temporal query engine, such as spatial-temporal query engine 155 of FIG. 1. The information mashup application and spatial-temporal query engine together may drive the given context value, as shown at workflow 306 and match the retrieved data with required context, as shown at workflow 308. The information mashup application and spatial-temporal query engine together may capture context value that may be relevant to the user's information goals. Additionally, by matching the retrieved data with required context at workflow 308, the information mashup application and the spatial-temporal query engine also may reduce the search space by removing some or all data that falls outside of a required context.

FIG. 4 is an illustration of a block diagram of another workflow, in accordance with an illustrative embodiment. The workflow depicted in FIG. 4 may be implemented using system 100 of FIG. 1. The workflow shown in FIG. 4 may be implemented by a processor, such as processor unit 604 of FIG. 6. The workflow shown in FIG. 4 may be a variation of the processes shown in FIG. 1, FIG. 2, FIG. 3, and FIG. 5. Although the operations presented in FIG. 4 are described as being performed by "a workflow," the operations are being performed by at least one tangible processor or using one or more physical devices, as described elsewhere herein.

Reference numerals common to FIG. 1 may relate to similar features. Thus, for example, spatial query engine 155 shown in both FIG. 1 and FIG. 4 may relate to the same kind of spatial query engine, though they need not be the same. However, for purposes of the illustrative embodiments described herein, functions and aspects of spatial query engine in FIG. 1 and FIG. 4 may be considered interchangeable, unless stated otherwise.

Process 400 may begin by receiving information at one or more information gateways, such as gateway 402. The workflow may then perform tensor text mining 404, including the processes of tensor analysis and tensor decomposition described with respect to FIG. 1. Simultaneously, or perhaps sequentially, the workflow may perform constraint-based activity mining (CMAP) pattern mining 406. CMAP pattern mining 406 may be a method of mining data to discover activity patterns within the data. The method includes receiving data to be mined from at least one data source, determining which of a number of specified interests and constraints are associated with the mining process, selecting corresponding mining agents that combine search algorithms with propagators from the specified constraints, and finding any activity patterns that meet the specified interests and constraints. CMAP pattern mining 406 may include constraint-based mining of activity patterns previously determined, as described with respect to FIG. 1. The information may then pass to one or more additional gateways, such as gateway 408.

A reduction server, such as reduction server 110 of FIG. 1, may use an output of these processes in constructing a contextual query filter, such as contextual query filter 132 of FIG. 1 and also shown in FIG. 4. Contextual query filter 132 may be passed to information mashup application 150 and spatial-temporal query engine 155 via gateway 410, which are described with respect to FIG. 1 and shown in FIG. 4. Information mashup application 150 and spatial-temporal query engine 155 together may reduce search space by removing irrelevant results, as described above with respect to FIG. 1 and FIG. 3. Thus, the individual outputs or combined outputs of spatial query engine 155 and information mashup application 150 may be a smaller data set from which information the user considers to be irrelevant has been removed. This output may be referred to as reduced output.

In an illustrative embodiment, the reduced output may be sent to another gateway, such as gateway 412. The reduced output may be stored, displayed to the user, or transmitted elsewhere, such as but not limited to another application or piece of hardware. The process may terminate thereafter.

FIG. 5 is an illustration of a block diagram of another workflow, in accordance with an illustrative embodiment. The workflow depicted in FIG. 5 may be implemented using system 100 of FIG. 1. The workflow shown in FIG. 5 may be implemented by a processor, such as processor unit 604 of FIG. 6. The workflow shown in FIG. 5 may be a variation of the processes shown in FIG. 1, FIG. 2, FIG. 3, and FIG. 4. Although the operations presented in FIG. 5 are described as being performed by "a workflow," the operations are being performed by at least one tangible processor or using one or more physical devices, as described elsewhere herein.

Reference numerals common to FIG. 1 may relate to similar features. Thus, for example, spatial query engine 155 shown in both FIG. 1 and FIG. 5 may relate to the same kind of spatial query engine, though they need not be the same. However, for purposes of the illustrative embodiments described herein, functions and aspects of spatial query engine in FIG. 1 and FIG. 5 may be considered interchangeable, unless stated otherwise.

Process 500 is an alternative process to those shown in FIG. 3 and FIG. 4. Process 500 also depicts tensor text mining 502, including the processes of tensor analysis and tensor decomposition described elsewhere herein. However, in FIG. 5, tensor text mining 502 is depicted as being performed on received open source unstructured text 504. Open source unstructured text may include, but is not limited to, TWITTER® TWEETS®.

CMAP pattern mining 506 may include constraint-based mining of activity patterns, as previously described herein. Input for CMAP pattern mining 506 may include open source text, such as open source text 508, which could include for example TWITTER® TWEETS®. CMAP pattern mining 506 may also include other sources of text or non-text data, or combinations thereof, such as in some cases police incident reports 510, video, pictures, sound, or other data sources.

Gateways, such as gateway 512 and gateway 514, may be used to receive and output information. These gateways may be optional in some illustrative embodiments.

As also described previously, output of tensor text mining and constraint-based mining of activity patterns via gateway 514 may be used by a reduction server, such as reduction server 110 of FIG. 1, in constructing a contextual query filter, such as contextual query filter 132 as shown in both FIG. 1 and FIG. 5. Construction of contextual query filter 132 may result in multiple instances of contextual query filters based on at least one of user, time, location, events, and possibly other factors. The contextual query filter or filters may be exported via gateway 516 to both a spatial query engine, such as spatial query engine 155 shown in both FIG. 1 and FIG. 5, and an information mashup, such as information mashup application 150 shown in both FIG. 1 and FIG. 5.

Thus, the reduction server, such as reduction server 110 of FIG. 1, may pass contextual query filter 132 to information mashup application 150 and spatial-temporal query engine 155. Information mashup application 150 and spatial-temporal query engine 155 together reduce a search space by removing irrelevant results.

Input to information mashup application 150 may include many different sources, such as police data 518, fire 911 data 520, and social service data 522, which might be data from TWITTER® users. Many other forms of data may be input into spatial query engine 155, including but not limited to relevant images and videos, news agency reports, locations of interest, and maps, such as map 524. Input to spatial query engine 155 may include similar data sources, such as police data 526, fire 911 data 528, and neighborhood data 530, which may also take the form of social service data. Other forms of data may be input into spatial query engine 155, including but not limited to maps 524, global positioning system satellite data, and other types of spatial data.

The resulting output of spatial query engine 155 and information mashup application 150 may be output separately or output into a combined set of data. In any case, the output may be transmitted via gateway 532 and then one of stored, displayed to a user, transmitted to other software or hardware, or otherwise processed. The process may terminate thereafter.

The illustrative embodiments are not limited to the descriptions provided above. The illustrative embodiments might be expressed as pseudo code. For example, the illustrative embodiments could be expressed as follows:

Do while (capture user-context)
If data associated context match user-context then
Retrieve the data using the known contextual value
Else remove it from search space
End do This pseudo code may represent how the illustrative embodiments may reduce a search space and provide a user with correct or relevant information in a useful context.

Existing approaches for information filters, such as database query and semantic filters algorithms are either highly dependent on the accuracy of the parser in case of semantic filters or rely on "static information value" only. However, the illustrative embodiments provide another dynamic aspect. This other dynamic aspect may be that, even if the information value remains the same, the filtered information may generate different results because of the surrounding contextual information.

The illustrative embodiments described herein have other advantages. For example, the illustrative embodiments present a modular, flexible, extensible meta-model to represent, and filter, data based on contextual multi-dimensional information. The illustrative embodiments also dynamically retrieve contextually relevant information and reduce irrelevant information. The illustrative embodiments also provide for automated meaning extraction, contextual correlation derivation, and prediction of future requests for information by changing context without relying on parser accuracy. The illustrative embodiments have other uses, as explained above.

Turning now to FIG. 6, an illustration of a data processing system is depicted in accordance with an illustrative embodiment. Data processing system 600 in FIG. 6 is an example of a data processing system that may be used to implement the illustrative embodiments, such as system 100 of FIG. 1, or any other module or system or process disclosed herein. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

Data processing system 600 may also include associative memory 628. Associative memory 628 may be in communication with communications fabric 602. Associative memory 628 may also be in communication with, or in some illustrative embodiments, be considered part of storage devices 616. While one associative memory 628 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising a reduction server in a processor unit comprising:
   a context-entity factory configured to:
      build a data model defining an ontology of data objects that are context-aware;
      text mine activity patterns on a first body of data comprising open-source unstructured text; and
      constraint-based mine activity patterns on a second body of data drawn from multiple heterogeneous sources, such that the data model further defines metadata tags for the data objects, and the reduction server communicates with a storage device configured to store the data objects as stored data objects, the storage device further configured to store associated contexts for corresponding ones of the stored data objects; and
   a reduction component configured to:
      employ at least one information mashup application configured to access a spatial-temporal query engine to generate an output of contextual relationships of multiple spatial data and temporal data objects;
      capture a current context value of a first data object defined in the ontology of data objects; and
      compare the current context value of the first data object with stored values of the associated contexts, such that when the current context value does not match a particular stored value of a particular associated context in the associated contexts, the reduction component is further configured to remove a corresponding particular stored data object and the particular associated context from the stored data objects.

2. The computer system of claim 1, wherein the data objects are associated with persons and contextual information comprises at least one of location, identity, time and activity.

3. The computer system of claim 1, wherein the current context value of the first data object is captured from at least one unstructured text-based data service, and the storage device comprises at least one of: an optical disk, a magnetic disk, a hard drive, and a thumb drive.

4. The computer system of claim 1, wherein the context-entity factory is further configured to perform a tensor analysis of a plurality of unstructured data objects to derive contextual relationships among the unstructured data objects as a first step of building the data model.

5. The computer system of claim 4, wherein the context-entity factory is further configured to perform constraint-based mining of activity patterns of data associated with the unstructured data objects to determine the activity patterns representing the contextual relationships among the unstructured data objects as a second step of building the data model.

6. The computer system of claim 5, wherein:
the data is sourced from multiple sources;
the computer system further comprises one of a publisher and an integrator;
the publisher is configured to one of publish an output of the reduction component as a service in a service oriented architecture and publish the output to at least one of an enterprise portal, an application, a development tool; and
the integrator is configured to interoperate an output of the reduction component with an enterprise application technology selected from at least one of a security application, a governance application, a monitoring application, and an availability application.

7. The computer system of claim 1, wherein the reduction component is further configured to employ at least one information mashup application to yield a reduced number of data objects relative to a beginning number of data objects, and wherein the computer system further comprises:
a query component configured to query the reduced number of data objects.

8. The computer system of claim 1, wherein the at least one information mashup application is configured to combine the output of contextual relationships from the spatial-temporal query engine with data drawn from at least one heterogeneous information source to yield a reduced number of data objects relative to a beginning number of data objects.

9. The computer system of claim 1, wherein the reduction component is configured to filter irrelevant information using an associative memory based on the output of contextual relationships generated by the at least one information mashup application.

10. A computer system comprising a reduction server in a processor unit comprising:
a context-entity factory configured to:
build a data model defining an ontology of data objects that are context-aware;
build, using at least one contextual query engine, at least one contextual query filter;
text mine activity patterns on a first body of data comprising open-source unstructured text, and submit an output of text mining of activity patterns and output of constraint-based mining of activity patterns to at least one contextual query engine; and
constraint-based mine activity patterns on a second body of data drawn from multiple heterogeneous sources, such that the data model further defines metadata tags for the data objects, and the reduction server communicates with a storage device configured to store the data objects as stored data objects, the storage device further configured to store associated contexts for corresponding ones of the stored data objects; and
a reduction component configured to:
employ at least one information mashup application configured to access a spatial-temporal query engine to generate an output of contextual relationships of multiple spatial data and temporal data objects;
capture a current context value of a first data object defined in the ontology of data objects; and
compare the current context value of the first data object with stored values of the associated contexts, such that when the current context value does not match a particular stored value of a particular associated context in the associated contexts, the reduction component is further configured to remove a corresponding particular stored data object and the particular associated context from the stored data objects.

11. A computer system comprising a reduction server in a processor unit comprising:
a context-entity factory configured to:
build a data model defining an ontology of data objects that are context-aware;
build, using at least one contextual query engine, at least one contextual query filter, and provide the contextual query filter to at least one information mashup application for combination with at least one semantic query template, such that at least one application mashup is configured to combine the at least one contextual query filter and at least one semantic query template to produce at least one refined semantic query;
text mine activity patterns on a first body of data comprising open-source unstructured text, and submit an output of text mining of activity patterns and output of constraint-based mining of activity patterns to at least one contextual query engine; and
constraint-based mine activity patterns on a second body of data drawn from multiple heterogeneous sources, such that the data model further defines metadata tags for the data objects, and the reduction server communicates with a storage device configured to store the data objects as stored data objects, the storage device further configured to store associated contexts for corresponding ones of the stored data objects; and
a reduction component configured to:
employ at least one information mashup application configured to access a spatial-temporal query engine to generate an output of contextual relationships of multiple spatial data and temporal data objects;
capture a current context value of a first data object defined in the ontology of data objects; and
compare the current context value of the first data object with stored values of the associated contexts, such that when the current context value does not match a particular stored value of a particular associated context in the associated contexts, the reduction component is further configured to remove a corresponding particular stored data object and the particular associated context from the stored data objects.

* * * * *